Patented Dec. 10, 1940

2,224,252

UNITED STATES PATENT OFFICE 2,224,252

FOOD PRODUCT AND THE PROCESS OF MAKING IT

Edward C. Callaway, Corvallis, Oreg.

No Drawing. Application October 10, 1938,
Serial No. 234,289

12 Claims. (Cl. 99—1)

This is a continuation in part of my application No. 29,518.

This invention relates particularly to a quantitative mineral or inorganic composition of products of edible character, such as foods and feeding materials and food supplements for use in foods or drinks, and to the method of producing the same, preserving the vital physiological characteristics of the natural foods.

The product of this invention is a substance of edible character having a unique composition, in that the organic salts of the base forming elements are increased therein, and having the same quantitative ratio to one another as the approximate mean of free bases in the water of blood and muscle combined.

The process of this invention consists essentially in adding the necessary quantitative amounts of the base-forming elements to products of edible character so that the ratio of sodium, potassium, calcium and magnesium, in any such edible product so treated or processed, will be substantially the same ratio of said sodium, potassium, calcium, and magnesium, as is contained in the whole blood of the animal body, and that the total quantitative amount of said base forming elements in said edible products is increased to three or more times the natural content.

Preliminary to the process of this invention, the food product, or drink, of whatever nature, to be processed is carefully analyzed to determine the average composition of the base-forming elements and acid-forming elements contained therein. The physical constants of specific gravity and hydrogen ion concentration are also determined. In accordance with these predetermined facts, the necessary quantitative amounts of the base-forming elements, to-wit: sodium, potassium, calcium, and magnesium in the form of salts of citric, tartaric and lactic acids, are introduced into said food product or drink being processed, by means of a water solution of the same specific gravity and hydrogen ion concentration as that of the aqueous portion of said food product or drink under process.

Dissolving the added basic salts directly in the aqueous portion of the natural food, in most cases, so increases the salt concentration therein as to alter or materially change the vital food characteristics of said food. But by adding the required base-forming elements to a food product or drink, by the method of this invention, the vitamines, proteins and all other natural constituents of the food product or drink so processed, are preserved unchanged.

A product processed by means of this invention is a new composition physiologically valuable in the following particulars:

First: The amount of the base-forming elements are increased by three or more times that of the product in its natural or normal state.

Second: The ratio of the base-forming elements to one another is the ratio of the approximate mean of free bases in the water of blood and muscle combined.

In terms of equivalent weights, the approximate mean ratio of this invention is preferably: sodium 100, potassium 78, calcium 3.4, and magnesium 3.3, or the normal optimum ration of the base-forming elements in the soft tissues of the animal body. Food products or drinks processed by means of this invention, are so adjusted, that the base elements of such food products or drinks, when consumed as such, enter the body in the optimum ratio of body fluids, which optimum concentration makes them immediately available to enter into the body reactions and functions. Such alkaline foods as fruits, fruit juices, vegetables and milk products, processed by means of this invention are three times or more as efficient as the same food in its natural state, in overcoming the hyper-acid effect of a meat-cereal diet. In treating the known acid food products, such as meats and cereals, by the process of this invention, the total amount of base-forming elements are increased so that they exceed the acid-forming elements. Thus an alkaline bread, cereal or meat is produced.

The method or manner of processing a food product or drink by means of this invention is as follows:

I analyze the food product or drink to be processed, recording the milligrams-percent of the elements, sodium, potassium, calcium, magnesium, phosphorus, chlorine, and sulfur. I also determine the specific gravity and hydrogen ion concentration of said food product or drink. By dividing the milligrams per 100 grams of the elements by the equivalent weight of the elements, I calculate the units of base- or acid-forming elements per 100 grams. In this calculation calcium, magnesium, phosphorus, and sulfur are considered to be divalent and sodium, potassium, and chlorine as monovalent. Upon determining the excess amount of base- or acid-forming elements present in the natural product, I then calculate the amount of sodium, potassium, calcium, and magnesium necessary to add to said product being processed, that will bring the ratio of the hereinbefore stated base-forming elements up to the approximate mean ratio of this invention, or sustantially, sodium 100, potassium 78, calcium 4.3, and magnesium 3.3. Having determined the theoretical amount of said base-forming elements required to add, I then proceed to the practical calculation of the amount of sodium citrate, potassium citrate, sodium tartrate, potassium tartrate, potassium bitartrate, calcium lactate, magnesium lactate, tartaric acid, lactic acid, or citric acid required to be added to the quantity of food product or drink under process that will bring the whole mass up to the total base content and ratio of base-forming elements as hereinbefore set forth, and make a solution of the same specific gravity and hydrogen ion concentration of the juice of the food product or drink being processed. The calculated quantities of chemicals are then weighed out and dissolved in the previously calculated quantities of water. For this purpose, the amount of water is used that will make a solution of said chemicals of the same specific gravity and hydrogen ion concentration of the food product or drink being treated. The water solution is then added in the following manner: If the food product or drink under process is in liquid form, said water solution is added thereto at ordinary temperature in a suitable vat or container and thoroughly mixed or stirred until a test of any part of the mass will show that a chemical equilibrium has been established. In processing a food product, not in liquid form, I convey the organic salts of the said base-forming elements into the product in a water solution of a less specific gravity but of approximately the same pH as the juice of the food being processed, by simple absorption of said water solution, and then extract the excess water by means of evaporation. The liquids or non-liquids thus treated are then ready for consumption or to be bottled, canned, preserved or otherwise prepared for market in the usual and ordinary way.

As examples, the following detailed descriptions show the process of this invention as applied to tomato juice, orange juice, grape juice, and to a whole-wheat cereal or breakfast food:

The term "unit" as used in the following examples and elsewhere in this application, shall mean and is defined to be, the milligrams of the element, base or acid, per 100 grams divided by the equivalent weight of the element. That is, the unit is a milli-equivalent of the element as said element reacts in a neutralization reaction, acid against base.

The terms "base," "base element" and "base-forming element," are used interchangeably in the following examples and elsewhere in this application, and shall mean and are each defined to be, the elements sodium, potassium, calcium and magnesium.

The term "acid" or "acid-forming element" as used in this application shall mean and is defined to be the elements phosphorus, chlorine, and sulfur.

By applying the method heretofore in this application set forth, the units of base- and acid-forming elements of the natural juice are determined, and the necessary units of base to be added:

*Tomato juice*

|  | Bases | | | | Acids | | |
|---|---|---|---|---|---|---|---|
|  | Na | K | Ca | Mg | P | S | Cl |
| Natural product, mgs | 15.0 | 311.0 | 6.0 | 11.0 | 48.0 | 17.0 | 43.0 |
| Units | .6 | 7.9 | .3 | .9 | 3.2 | 1.1 | 1.2 |
| Units added | 9.5 |  | .1 |  |  |  |  |
| Total units | 10.1 | 7.9 | .4 | .9 | 3.2 | 1.1 | 1.2 |

Normal specific gravity 1.040, and pH 4.4.

After process total base units are 19.3 and total acid units are 5.5. Practically, to each 100 grams of tomato juice as analyzed and tested by the method of this invention, 24 ccs. of water solution is added, containing 0.935 gram sodium citrate ($Na_3C_6H_5O_7.2H_2O$), 0.12 gram calcium lactate ($Ca(C_3H_5O_3)_2$), and 0.084 gram of anhydrous citric acid ($H_3C_6H_5O_7$), the mass is mixed and tested for specific gravity and hydrogen ion concentration.

*Orange juice*

|  | Bases | | | | Acids | | |
|---|---|---|---|---|---|---|---|
|  | Na | K | Ca | Mg | P | S | Cl |
| Natural product, mgs | 8.0 | 183.0 | 29.0 | 17.8 | 20.0 | 16.0 | 3.0 |
| Units | .3 | 4.6 | 1.4 | 1.1 | 1.3 | 1.0 | 0.3 |
| Units added | 8.6 | 2.3 |  |  |  |  |  |
| Total units | 8.9 | 6.9 | 1.4 | 1.1 | 1.3 | 1.0 | 0.3 |

Normal specific gravity 1.068, and pH 4.8.

After process total base units are 18.3 and total acid units are 2.6. Practically, to each 100 grams of orange juice as analyzed and tested by the method of this invention, 16.5 ccs. of water solution is added, containing 0.837 gram of sodium citrate ($Na_3C_6H_5O_7.2H_2O$), 0.241 gram potassium citrate ($K_3C_6H_5O_7.H_2O$) and 0.055 gram citric acid ($H_3C_6H_5O_7$), the mass is mixed thoroughly and allowed to macerate for one-half to two hours.

*Grape juice*

|  | Bases | | | | Acids | | |
|---|---|---|---|---|---|---|---|
|  | Na | K | Ca | Mg | P | S | Cl |
| Natural product, mgs | 5.0 | 106.0 | 11.0 | 9.0 | 17.0 | 9.0 | 2.0 |
| Units | 0.2 | 2.7 | 0.5 | 0.8 | 1.1 | 0.5 | 0.07 |
| Units added | 9.8 | 5.1 |  |  |  |  |  |
| Total units | 10.0 | 7.8 | 0.5 | 0.8 | 1.1 | 0.5 | 0.07 |

Normal specific gravity 1.078, and pH 4.2.

After process total base units are 19.1 and total acid units are 1.7. Practically, to each 100 grams of grape juice as analyzed and tested by the method of this invention, 18 ccs. of water solution is added, containing 0.956 gram sodium citrate ($Na_3C_6H_5O_7.2H_2O$), potassium citrate ($K_3C_6H_5O_7.H_2O$), 0.029 gram of potassium bitartrate ($KHC_4H_4O_6$), and 0.119 gram of citric acid ($H_3C_6H_5O_7$), the mass is mixed thoroughly and allowed to macerate for one-half to two hours.

*Whole wheat cereal*

|  | Bases | | | | Acids | | |
|---|---|---|---|---|---|---|---|
|  | Na | K | Ca | Mg | P | S | Cl |
| Natural product, mgs | 39.0 | 473.0 | 45.0 | 38.0 | 423.0 | 68.0 | 181.0 |
| Units | 1.8 | 12.1 | 2.2 | 3.0 | 28.2 | 2.0 | 22.0 |
| Units added | 28.2 | 11.3 |  |  |  |  |  |
| Total units | 30.0 | 23.4 | 2.2 | 3.0 | 28.2 | 2.0 | 22.0 |

Normal specific gravity, water 11.2%.

After process total base units are 58.6 and total acid units are 52.6. Practically, to each 100 grams of whole wheat as analyzed and tested by the method of this invention, 25 ccs. of water solution is added, containing 2.8 grams of sodium citrate ($Na_3C_6H_5O_7.2H_2O$), and 1.28 grams of potassium citrate ($K_3C_6H_5O_7.H_2O$), by allowing said solution to soak into the wheat, after spraying it on in a fine spray, after the wheat soaks up the solution it is dried in a blast of warm air until the moisture content is again reduced to 11 to 12 per cent, said wheat is then ready to be milled or otherwise processed.

It will be observed that in each of the foregoing examples the base elements are increased more than three times the normal base elements contained in the products before being processed.

Food products or drinks processed by the method of this invention are used in the diet in the same manner as said food products or drinks if not processed and the palatability of same products or drinks is not changed or affected. Acid foods and drinks have the excess acid reduced. Alkaline foods are augmented in the total base content, to a more effective and rational basis, e. g. the average person by using foods or drinks processed by this invention will find it convenient to include an effective alkaline balance in his diet.

It will be evident from the foregoing that in the present invention several things are accomplished, First: The mineral constituents of the food product or drink are brought to a better balance or what might be termed an optimum balance according to the physiological needs of the animal organism. Second: The base elements are added to the food product or drink in a form that makes them readily available to build up the ionic alkali reserve of the blood. Third: The organic salts of the base elements are added to the foods in water solution in the same specific gravity as the juice of said food or drink. Fourth: The hydrogen ion concentration is maintained at that of the natural food juice to preserve the vitamines and other constituents affected by acidity or alkalinity, and only natural fruit acids are used for this purpose. Fifth: The extremely high potassium content of certain foods and the disturbance this produces in the animal body is overcome. Sixth: Acid foods are made alkaline or neutral in the final residue they leave in the animal body. Seventh: Alkaline foods are built up to adequate proportions in content of total base elements so as to be more effective in balancing the acid side of the diet when used in rational amounts such as the average family might purchase.

It has long been known that the foods used largely in the average American diet tend habitually toward a residue of acid-producing elements in the body. In general, meats, cereals and eggs are found to be acid producing, while fruits, vegetables and milk are base producing. Since 60% of the average diet consists of meats, eggs and grain products, it is well known to scientists that the majority of the American people are on an acid diet. It is also well known that the healthy natives of many tropical islands are on a basic diet of vegetables, fruit and fish. In average meats the acid-forming elements, phosphorus, sulfur and chlorine, exceed the base-forming elements, sodium, potassium, calcium and magnesium, by 12 to 15 units per 100 grams. In average grain products the acid-forming elements exceed the base-forming elements by 12 to 14 units per 100 grams. Fruits in general yield on an average only 4 to 5 units of base-forming elements in excess of acid-forming elements per 100 grams. Citrus fruits, by the same comparison, yield 5 to 6 units of excess base, and potatoes yield 7 units of base in excess of acid-forming elements per 100 grams. Thus it is evident that the basic foods, weight for weight, in the diet are inadequate to overcome the excess of acid-forming elements in a meat-cereal diet.

It s known that the alkaline foods are not properly balanced in the quantitative ratio of the base-forming elements to one another. In most foods of alkaline character there is a lack of balance between calcium and potassium, but the most pronounced lack of balance is in the sodium-potassium ratio as compared with body requirements.

The following table summarizes the quantitative ratios of the four base-forming elements in the accepted alkaline foods in terms of units per 100 grams of food. Also the table compares these ratios with the units of the base elements found in the fluids of the soft tissues of the bodies.

|  | Sodium | Potassium | Calcium | Magnesium |
|---|---|---|---|---|
| Average fruits | 1.0 | 5.6 | 1.3 | 1.4 |
| Citrus fruits | 1.0 | 5.3 | 1.8 | 0.8 |
| Orange juice | 0.3 | 4.5 | 1.4 | 0.9 |
| Tomato juice | 0.6 | 7.7 | 0.3 | 0.8 |
| Grape juice | 0.2 | 2.6 | 0.5 | 0.3 |

The sodium-potassium ratios in the above is from 1:5.3 to 1:15.

|  | Sodium | Potassium |
|---|---|---|
| Total water of blood and muscle, ratio | 100 | 185 |
| Ratio of free bases in total water of blood and muscle | 100 | 169 |
| Ratio in blood serum | 100 | 3.4 |
| Mean ration of free bases between serum and total water, soft tissues | 100 | 81 |
| Ratio of invention | 100 | 78 |

From the above comparison it is apparent that unless the element potassium can be substituted for sodium in its functions in the animal body, the alkaline foods do not carry the proper mixture of base elements to adequately and quickly build up the alkaline reserve of the blood. It is well known that potassium is not an adequate or satisfactory substitute for sodium since potassium functions mainly in the cells and sodium in the serum of the animal blood, (3); potassium functions with calcium to maintain the rhythmic action of heart muscle, (4); potassium intake causes sodium excretion, (5); in the acidosis following the toxemia of pregnancy, sodium is the deficient element (6); potassium causing diuresis and sodium having a strong tendency for retention in body fluids in ionic distribution.

In natural foods it is the base elements combined with such organic radicals at citric, tartaric, malic, succinic, oxalic, acetic, and lactic that contribute to the alkali reserve of the blood, the acid radicals being consumed in the metabolism. Of these organic radicals, the present invention prefers citric, tartaric and lactic to carry the base elements into the food material since the animal organism is more tolerant to these (7), than to other organic fruit and vegetable acids.

The practical benefits of this invention are as follows: produces an alkaline diet, especially well balanced between sodium, potassium and calcium; facilitates a neutral or slightly alkaline saliva, and maintains a favorable influence in dental hygiene; reduces acidosis, usually associated with influenza and colds; builds up the alkali reserve relieving fatigue, whereby athletes perform more effectively.

Knowing the general effect of a mild acidosis, and the difficulty of treating symptomatic acidosis in diabetes, nephritis, pregnancy, severe intoxication, surgical shock, rheumatism, arthritis, toxemia and the like, the physician may prescribe the products of this invention, to build up and maintain the alkali reserve of the blood.

Food products or drinks processed by this invention will be valuable at training tables for athletes, since the high protein and vitamine diet necessary in foods and drinks now used depletes the alkali reserve. The part that vitamines play in the metabolism of these mineral salts is known to some extent, hence the ample mineral content of the diet is made a part of the foods themselves maintaining the full vitamin function.

It is well known that each metal element has its own peculiar relation to function in the animal body. No metal can be substituted for another without loss of function. It is well established that both the quantitative amount of metals in the animal body and the quantitative ratio of the metals to each other have a definite relation to function. While nature permits variations physiological experiments by this inventor and others show that there is a well defined minimum, optimum, and maximum ratio of body metals to each other. This is true of the body bases, sodium, potassium, calcium and magnesium. For the purpose of this invention the quantitative ratio of sodium to potassium is of peculiar importance.

Through physiological mineral metabolism of the human body as a whole the optimum or best ratio of sodium to potassium is an average sodium—100 to potassium—78. I have found the optimum range to be sodium 100 to potassium 60 to 110. Favorable retention and use by the fluids and tissues of the body of sodium and potassium I have observed in ratios outside the optimum, where the amount of potassium is less than optimum in relation to sodium, such as the following:

| Sodium | Potassium |
|--------|-----------|
| 100 | 50 |
| 100 | 45 |
| 100 | 40 |
| 100 | 35 |
| 100 | 30 |

Slightly below the ratio sodium 100-potassium 30, I have determined is the physiological minimum of the favorable ratio between these two base metals. When the ratio of potassium is further reduced, there is undue retention of potassium and a corresponding undue increase in the excretion of sodium and ammonium. When the ratio of potassium to sodium is increased above sodium 100-potassium 110 favorable retention is observed up to the ratio, sodium 100-potassium 185—which appears to be the upper limit of the favorable ratio or the maximum physiological ratio in relation to metabolism. Above this ratio there is undue loss of sodium and the acid-base mechanism of the body is thrown out of balance. Above this maximum ratio, as the amount of potassium increases it grows more difficult to maintain a high or optimum alkali reserve in the body. My physiological results are in accord with Gerard who found that a mixed diet with sodium chloride added resulted in a ratio of sodium—100, potassium—150 in the whole body, and with Miller who found that the administration of potassium caused an undue amount of sodium to be excreted.

From authentic tables of food analyses we find the following ratios of sodium to potassium.

| Food | Sodium | Potassium |
|------|--------|-----------|
| Apples | 100 | 1,155 |
| Oranges | 100 | 1,470 |
| Peaches | 100 | 970 |
| Pears | 100 | 850 |
| Potatoes | 100 | 2,040 |
| Carrots | 100 | 280 |
| Beans | 100 | 1,200 |
| Whole wheat | 100 | 1,200 |

Fruit and vegetables generally show this high ratio of potassium to sodium.

From these data and my physiological experiments it is evident that plant foods do not furnish sodium and potassium in a ratio most favorable for utilization by the animal body but in a ratio much too high in potassium. Obviously, this relative high potassium intake cannot be balanced by the addition of sodium chloride to the diet for the chloride ion offsets the sodium ion in the acid-base balance of the organism.

Thus the novelty of this invention is apparent: by means of a more favorable ratio of sodium to potassium, preferably sodium 100—to potassium 78; or including an optimum range of sodium 100 to potassium 60–110; and a variable range of sodium 100 to potassium 185, the mineral nutrients in foods and food drinks are greatly improved.

While these favorable ratios are preferred for the purpose of this invention, by the application of this invention in adding the organic salts of base elements such as sodium, calcium and magnesium to high potassium foods would tend to bring them toward a favorable ratio of metal elements and improve their nutritive value.

In all my experiments the metals are carried into the body linked to organic radicals rather than an inorganic radical such as chloride or sulfate. By so doing the organic radical is burned to $CO_2$ and $H_2O$ in the general metabolism and the metal is available to neutralize or offset such acid radicals as $(SO_4)$, $(PO_4)$, and Cl formed in the metabolism.

My invention resulting from these physiological experiments has four novel features whereby foods, food drinks or food supplements furnish an improved and better mineral nutriment than natural food, in the following particulars:

1. The amount of total base is substantially increased above the normal, thus making for a less acid diet.
2. The added bases are linked to acid the radicals most favorable for the use of the metal as a base in the acid-base balance.
3. The metals, especially sodium and potassium are in a favorable ratio to each other for the body use.
4. Food, food drinks and food supplements processed by this invention retain their vitamine and other nutrient properties in that the H-ion concentration and specific gravity are not altered.

I am aware that others have prepared mixtures of salts of the bases for various purposes such as, substitutes for table salt, isotonic salt mixtures for treating cellular material, physiological salt mixtures in relation osmatic pressure and colloidal material, and methods of preserving comestibles, and some for physiological use. These all are of the approximate composition and ratio of elements to each other of blood serum or blood plasma, similar to such physiological salt solutions as Ringler's solution or Locke's solution. For the purpose of injecting material directly into the blood stream the utility of these solutions and these ratios of elements—especially sodium and potassium has long been known. The ratios of sodium to potassium in all these salt mixtures and solutions is sodium 100 to potassium less than 20.

My invention is for a different purpose—that of carrying the base metals into the animal body through the alimentary tract in an efficient manner. In contra-distinction to prior art the ratio of sodium to potassium in my invention ranges from sodium 100-potassium 30 and higher.

The present invention presents a rational and easy method of overcoming an acidosis, whether it be of the mild dietary type of depleted alkali reserve found in the average American family, or of the severe type of disease resulting in such symptoms as hyperpnoea, dyspnoea, and coma. At present, the consuming public can only buy the recommended alkaline foods, or take patent nostrum in the hope of overcoming the now known acid tendency of the diet.

Through the use of alkaline foods only the strict vegetarian can hope to maintain an alkaline balance between the acid and base-forming elements and then only an imperfect one much too high in potassum in relation to sodium, calcium and magnesium. For example, it would require thirty ounces of tomato juice to balance up the alkaline deficiency of one day's diet of steak, bread and butter, potatoes and gravy, string beans, and cup custard, and the like. Manifestly, this is not a rational amount of tomato juice to expect an individual to take. Further, the ratio of sodium to potassium would be 1:4.3, or much too high in potassium, forcing an equilibrium change of base elements between the cells and the body fluids.

The present invention insures that the foods treated by the prescribed process will have adequate amounts of total base elements in the best physiological form, and also that the optimum ratio between the base elements will be available to body fluids.

In physiological experiments on athletes, normal people, and those suffering from severe acidosis, it has been found that the use of foods treated by the process of this invention and having this new composition, easily correct the acid base balance in the human body when taken in rational amounts and that the alkaline balance is maintained for a much longer period of time per equivalent units of total base elements than when the untreated foods are taken.

In evidence of this, I cite the following summary of biochemical experiments tending to show the effect of ordinary tomato juice as compared with tomato juice treated by the process of this patent on more than ten subjects in my own laboratory:

| Urine test | Hours time after 2.5 grams total base | | | | | | |
|---|---|---|---|---|---|---|---|
| | 2 | 4 | 8 | 14 | 20 | 24 | 28 |
| Ordinary tomato juice | 11.2 | 6.3 | 12.2 | 16.5 | 19.1 | 20 | --- |
| Tomato juice processed by this method | 5.4 | 1.9 | 2.6 | 3.3 | 5.1 | 6.8 | 8.5 |
| $CO_2$ tension Alveolar air | | | | | | | |
| Ordinary tomato juice | 45 | --- | --- | 35 | 30 | 25 | --- |
| Processed tomato juice | 45 | --- | --- | 45 | 40 | 30 | --- |

Thus by two recognized biochemical methods it is demonstrated that the processed tomato juice is more effective in building up a sustained alkali reserve of the blood than ordinary tomato juice. Similar results were obtained on other food products. What is novel in this process is herein sustained, that a mixture of bases combined as the salts of fruit acids and being in the proportion of the bases found in whole blood actually has a much improved mineral food value.

The urine test used was the titration of urine for the total acid excreted in 25 cc. of urine plus the ammonium salts by the method of Folin. The test of the alveolar air to check the urine test was by the method of Marriott. The low urine test indicates a high alkali reserve. The high $CO_2$ tension indicated a high alkali reserve. It is noted that the processed tomato juice holds up the alkali reserve for a long period of time, longer than 24 hours, whereas ordinary tomato juice builds up the alkali reserve, but not so high and with ordinary tomato juice the alkali reserve drops back to an average or acid level in 8 hours. The explanation of this is found in the table of ratios of bases in fruit juices compared with blood. In the tomato juice the ratio of sodium to potassium is 0.6 to 7.7 or approximately 1 of sodium to 13 of potassium, whereas the body demands a ratio of sodium 100 to potassium 78, the ratio of this process and the new product of this invention. The animal body cannot be forced to use a wrong ratio of bases and the excess of potassium is soon sluffed off in the excreta and does not contribute to the body alkali reserve.

In general the process of this invention is applicable to any and all foods and feeding stuffs for men, animals and poultry. In all cases the principles involved in the process are the same, viz; the base elements are added in the form if citrates, lactates or tartrates in the amount of water that maintains natural specific gravity, and including in the water solution the proper amount of organic acid buffer to maintain the natural hydrogen ion concentration.

Obviously, a new composition of edible character containing the organic salts of the base elements in some other ratio than that of this invention may be prepared, but this invention prefers the approximate mean ratio of the water of the soft tissues or specifically sodium 100 to potassium 78 as the physiological optimum, without unnecessarily limiting the invention in this respect.

What I regard as new in this process and the product resulting therefrom, and for which I desire to secure by Letters Patent of the United States is:

1. An alkaline food prepared from any natural food or food product by increasing the amount of the base forming elements therein in the form of organic salts in such quantities that the proportions of the base elements sodium to potassium present shall be sodium 100 to potassium 30—185.

2. An alkaline food prepared from any natural food or food product by increasing the amount of the base forming elements therein in the form of organic salts in such quantities that the proportions of the base elements sodium 100, potassium 78, calcium 4.3 and magnesium 3.3 is attained.

3. An alkaline food prepared from any natural food or food product by increasing the amount of the base forming elements therein in the form of organic salts in a water solution and in such quantities that the proportions of sodium 100 to potassium 30—185 is attained.

4. An alkaline food prepared from any natural food or food product by increasing the amount of the base forming elements therein in the form of organic salts in a water solution of the same specific gravity and hydrogen ion concentration as the natural juice of the food being treated and in such quantities that the proportion of sodium 100 to potassium 30—185 is attained.

5. An alkaline food prepared from any natural food or food product by increasing the amount of the base forming elements therein in the form of organic salts in a water solution of the same specific gravity and hydrogen ion concentration as the natural juice of the food being treated and in such quantities that the proportions of sodium 100, potassium 78, calcium 4.3, and magnesium 3.3 is attained.

6. An alkaline drink prepared from any natural food drink by increasing the amount of the base forming elements therein in the form of organic salts in such quantities that the proportions of the base elements sodium 100 to potassium 30—185 is attained.

7. An alkaline drink prepared from any natural food drink by increasing the amount of the base forming elements therein in the form of organic salts in such quantities that the proportions of the base elements sodium 100, potassium 78, calcium 4.3, and magnesium 3.3 is attained.

8. An alkaline drink prepared from any natural food drink by increasing the amount of the base forming elements therein in the form of organic salts in a water solution and in such quantities that the proportions of sodium 100 to potassium 30—185 is attained.

9. An alkaline drink prepared from any natural food drink by increasing the amount of the base forming elements therein in the form of organic salts in a water solution of the same specific gravity and hydrogen ion concentration as the natural juice of the food being treated and in such quantities that the proportion of sodium 100 to potassium 30—185 is attained.

10. An alkaline drink prepared from any natural food drink by increasing the amount of the base forming elements therein in the form of organic salts in a water solution of the same specific gravity and hydrogen ion concentration as the natural juice of the food being treated and in such quantities that the proportions of sodium 100, potassium 78, calcium 4.3, and magnesium 3.3 is attained.

11. An alkaline food product containing the base forming elements in the form of organic salts in the proportion of sodium 100, potassium 30—185, calcium 4.3, magnesium 3.3.

12. An alkaline drink containing the base forming elements in the form of organic salts in the proportion of sodium 100, potassium 30—185, calcium 4.3, magnesium 3.3.

EDWARD C. CALLAWAY.